March 4, 1924.
T. H. OLSEN
AUTOMOBILE BUMPER
Filed Oct. 19, 1923
1,485,876
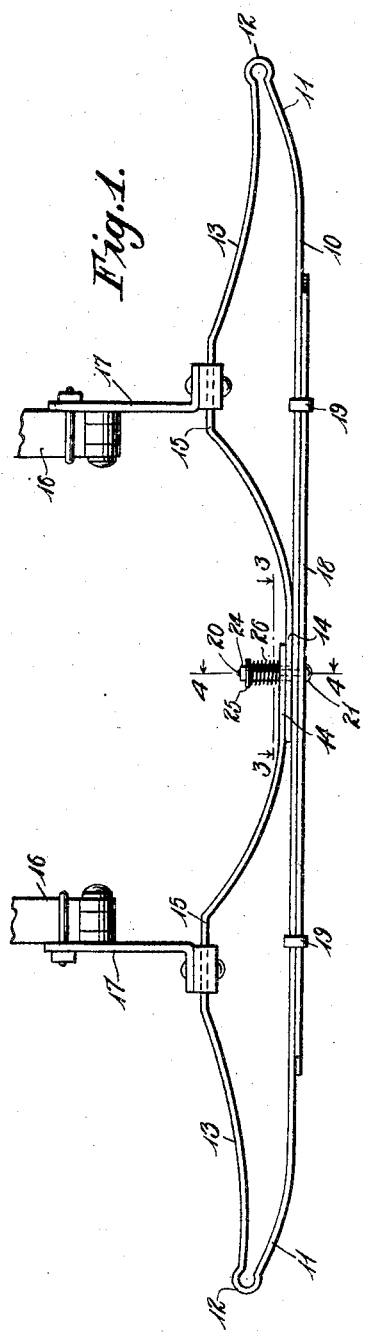
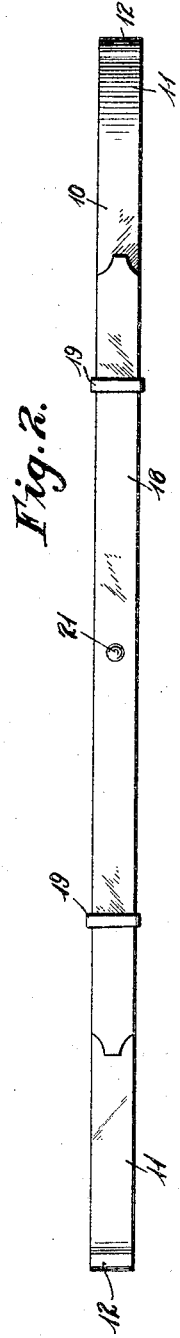
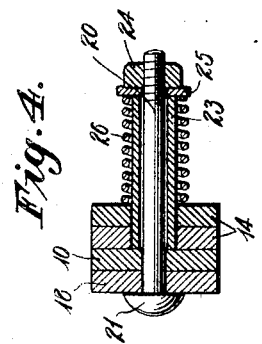
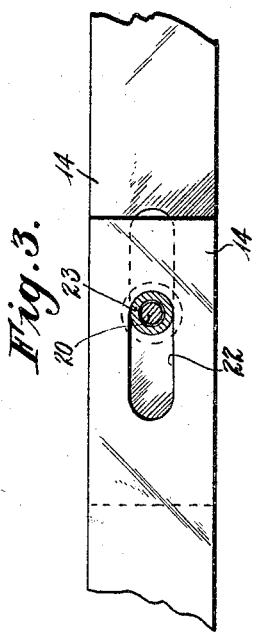
Inventor
*T. H. Olsen*
By *Trost & Collings*
Attorneys Patented Mar. 4, 1924.

1,485,876

UNITED STATES PATENT OFFICE.

TAGE H. OLSEN, OF FRESNO, CALIFORNIA.

AUTOMOBILE BUMPER.

Application filed October 19, 1923. Serial No. 669,585.

*To all whom it may concern:*

Be it known that I, TAGE H. OLSEN, a citizen of the United States, residing at Fresno, in the county of Fresno and State of California, have invented certain new and useful Improvements in Automobile Bumpers, of which the following is a specification.

This invention relates to automobile bumpers and particularly to a device of this character designed to successfully withstand heavy impacts without detrimental distortion or injury.

Another object of this invention is to provide a bumper which may be conveniently manufactured at a minimum cost and which will embody, with its simplicity, sufficient durability to make the same commercially acceptable. Furthermore, the invention has for its object to provide a bumper so constructed as to facilitate its attachment to the vehicle and one which will furthermore enhance, rather than detract from the symmetry and beauty of the automobile.

Still another object of this invention is to provide a bumper, the reinforcing supports of which are relatively slidable so as to successfully brace the same against ordinary impacts, but permit restricted movements of the bumper in cases of extra heavy impacts.

This invention further contemplates the provision of means for preventing the rattling of the bumper in use.

The construction of this improved bumper will be made more apparent as the description proceeds, especially when considered in connection with the drawings, wherein, Figure 1 is a top plan view of a bumper constructed in accordance with my invention;

Fig. 2 is a front elevation of the same;

Fig. 3 is an enlarged fragmentary sectional view, taken substantially on the plane indicated by the line 3—3 in Fig. 1; and, Fig. 4 is an enlarged transverse sectional view, taken substantially on the plane indicated by the line 4—4 in Fig. 1.

Referring now particularly to the drawings, wherein like reference characters indicate like parts, it will be noted that the bumper consists of a front bar 10, of metal, the ends 11 of which, preferably, although not necessarily, are inclined rearwardly, and terminate in rounded portions 12, the bar being continued to provide rearwardly extending portions 13 and overlapping ends 14.

Parallel intermediate portions 15 are provided by means of which attachment may be made to a portion 16 of the vehicle, by means of suitable brackets 17. In the present instance the bumper is shown as attached to the forward ends of the vehicle springs, although it will be obvious that attachment may be made to any convenient part of the vehicle, depending upon the arrangement and design of the same. Furthermore, any suitable type of bracket 17 may be employed, brackets herein shown being of a conventional type.

Arranged along the intermediate portion of the front bar 10 and in front thereof, is a reinforcing front plate 18, which is preferably nickel-plated and held in place by clips 19 in the usual manner. Extending through the plate 18, the front bar 10 and the overlapping ends 14, is a bolt 20, the head 21 of which bears against the front plate 18. The overlapping ends 14 of the bumper supporting bars are each formed with an elongated slot 22, and passing through this slot is a tubular sleeve-like member 23.

The bolt 20 passes through the front plate 18 and the front bar 10, and thence through the sleeve 23, the end being threaded to receive a nut 24, which engages a washer 25, which in turn is forced against the end of the sleeve 23. A coiled spring 26, surrounding the sleeve 23, engages on the one hand the washer 25 and on the other hand the adjacent end 14 of the bumper supporting bars.

In practice, the inherent rigidity of the material of which the bumper is constructed will be sufficient to withstand impacts of ordinary intensity, but in the event an impact is received of more than ordinary intensity, the front bar 10 and plate 18 will consequently be deflected rearwardly and the supporting portions 14 of the front bar will consequently slide relatively to one another by reason of their slotted connections 22. These slotted ends will slide upon the tubular sleeve 23, and against the tension set up by the spring 26. Obviously, when the object which has been engaged by the bumper bar is removed, the inherent resiliency of the bumper bar will return the same to the normal position.

In assembling the device the bolt 20 which is passed through the bars 18 and 10, and through the ends 14 of the rear bars, will also pass through the sleeve 23, and when the nut 24 is tightened against the washer 25, the spring 26, which has previously been placed upon the sleeve 23, will be forced against the adjacent end 14 of one of the rear bars, and will therefore engage these bars under pressure to prevent rattling of the bumper in use. Obviously, as mentioned hereinbefore, the tension of the spring will furthermore tend to partially resist the relative sliding movement of the supporting bars, and thus provide a friction breaking action, tending to resist deformation of the bumper.

While the invention has been described herein in some detail, it is not intended that the invention be unnecessarily limited, but reservation is made to make such changes as may come within the purview of the accompanying claims.

Having thus described the invention, what is claimed is:

1. In an automobile bumper a metal bar bent to form a front bumper bar and spaced rearwardly arranged supporting bars provided with overlapping ends and means passing through said front bar and overlapping ends for uniting the same, said overlapping ends being formed with slots for the purpose described.

2. An automobile bumper of the class described comprising a front bumper bar and supporting bars connected thereto and provided with overlapping ends arranged adjacent the center of said bumper bar, said overlapping ends being formed with elongated slots, a bolt passing through said bumper bar and overlapping ends for uniting the bars and a spring mounted on said bolt and engaging the overlapping ends of said supporting bar.

3. In an automobile bumper of the class described a single bar bent to form a front bumper bar and rearwardly arranged supporting bars provided with overlapping ends and intermediate portions for attachment to a vehicle, the overlapping ends of said supporting bars being formed with elongated slots, a sleeve extending through said slot, a bolt extending through said bumper bar and through said sleeve, a spring surrounding said sleeve and a nut and washer on said bolt for securing said spring under compression against the overlapping ends of said bars.

4. In an automobile bumper a front bumper bar, a facing plate secured to said bumper bar, rearwardly arranged supporting bars provided with forwardly extending overlapping ends arranged adjacent the center of said bumper bar, said overlapping ends being provided with elongated slots, a sleevelike member extending through said slots, a bolt extending through said facing plate, bumper bar and sleevelike member provided with a nut and washer on the end thereof and a spring tensioned by tightening said nut arranged between said washer and the overlapping ends of said supporting bars, for the purpose described.

In testimony whereof I affix my signature.

TAGE H. OLSEN.